United States Patent [19]
Nishiyama et al.

[11] Patent Number: 5,337,198
[45] Date of Patent: Aug. 9, 1994

[54] DIGITAL MAGNETIC WRITING AND READING APPARATUS

[75] Inventors: Nobumasa Nishiyama, Hachioji; Toshiaki Tsuyoshi, Kawasaki; Hajime Aoi, Tachikawa; Tetsuji Kameoka, Odawara; Masaya Tanaka, Odawara; Kazuhisa Shiraishi, Odawara, all of Japan

[73] Assignee: Hitachi, Ltd., Tokyo, Japan

[21] Appl. No.: 909,997

[22] Filed: Jul. 7, 1992

Related U.S. Application Data

[63] Continuation-in-part of Ser. No. 798,944, Nov. 27, 1991.

[30] Foreign Application Priority Data

Nov. 30, 1990 [JP] Japan ................... 2-337076
Jul. 10, 1991 [JP] Japan ................... 3-169663

[51] Int. Cl.[5] ........................................... G11B 5/035
[52] U.S. Cl. ....................................................... 360/65
[58] Field of Search .................. 360/65, 48, 46, 51, 360/45, 25, 60, 10.1, 32, 40, 67, 22, 61, 75; 369/59; 333/28 R; 375/11, 99, 101

[56] References Cited

U.S. PATENT DOCUMENTS

| | | | |
|---|---|---|---|
| 4,371,900 | 2/1983 | Huber | 360/40 |
| 4,528,501 | 7/1985 | Moriyama et al. | 360/51 X |
| 4,590,524 | 5/1986 | Okamoto et al. | 360/65 |
| 4,644,424 | 2/1987 | Nishiyama et al. | 360/65 |
| 4,755,890 | 7/1988 | Haber | 360/45 |
| 4,774,601 | 9/1988 | Ouchi et al. | 360/51 X |
| 4,875,112 | 10/1989 | Dost et al. | 360/65 |
| 4,907,100 | 3/1990 | Nishiyama et al. | 360/48 X |
| 5,008,761 | 4/1991 | Nishiyama et al. | 360/45 |
| 5,057,945 | 10/1991 | Shimada et al. | 360/61 X |
| 5,107,379 | 4/1992 | Huber | 360/46 |

FOREIGN PATENT DOCUMENTS

| | | |
|---|---|---|
| 61-59664 | 3/1986 | Japan . |
| 61-99906 | 5/1986 | Japan . |
| 61-114611 | 6/1986 | Japan . |
| 61-139980 | 6/1986 | Japan . |

*Primary Examiner*—Donald Hajec
*Assistant Examiner*—Patrick Wamsley
*Attorney, Agent, or Firm*—Fay, Sharpe, Beall, Fagan, Minnich & McKee

[57] ABSTRACT

A waveform equalizer for processing a signal read by a magnetic head from a magnetic written medium includes a slimming circuit which, in turn, has a first delay unit for delaying the read signal, a first attenuator connected in parallel with the first delay unit, a first differentiating circuit for receiving the output from the first delay unit and the output from the first attenuator, and a resistor connected to a first delay unit side input of the first differential circuit; and a pseudo-peak elimination circuit connected in series with the slimming circuit and including a circuit for separating the from the read signal the read signal or a signal reverse in phase to the read signal, a second delay unit for delaying the separated signal, a second attenuator for attenuating the amplitude of the separated signal, and a second differential circuit for receiving the read signal and the separated, delayed and attenuated signal.

15 Claims, 19 Drawing Sheets

FIG. II

DIGITAL MAGNETIC WRITING AND READING APPARATUS

This is a continuation-in-part application of Ser. No. 07/798,944, filed Nov. 27, 1991, the disclosure of which is hereby incorporated by reference.

BACKGROUND OF THE INVENTION

The present invention relates to signal processing systems for eliminating pseudo-peaks in a waveform read from a recording medium in a digital magnetic writing and reading apparatus which uses a thin film head (hereinafter referred to as a TFH), a magneto-resistive head (hereinafter referred to as a MR head) or a metal-in-gap head (hereinafter referred to as MIG head).

In order to obtain a rapid writing magnetic field due to an increased recording density, a TFH has been used in a digital magnetic writing and reading apparatus using peak detection. Since a small-sized magnetic disk device is slow in line speed, a method of separation of a write head from a read head has been used in which a TFH writes data while an MR head reads data. In a small-sized designed for cost reduction, an MIG head is used. However, the use of the TFH generates a pseudo peak, or undershoot, that is reversed in polarity to a main peak of a read waveform in the vicinity of the outside pole-tip corner of a pole because of a limited pole-tip length. In the MIG head, a pseudo-peak of the same polarity as the main peak in a read waveform appears in the interface between a bulk portion and a metal film in the gap. In the MR head, a magnetic material called a shield is disposed on each side of the magneto-resistive film in order to improve its read resolution. The use of the shield causes the head itself to slim the read waveform as well as to cause a pseudo-peak to occur simultaneously. When pattern data are read under such conditions, the pseudo-peak causes intersymbol interference with the read waveform in the vicinity thereof, so that a pattern peak shift would increase.

Thus, conventionally, undershoots in the TFH have been eliminated using a transversal equalizer as disclosed in JP-A-60-136902 (U.S. Pat. No. 4,644,424) and JP-A-61-59664 and a multi-tapped equalizer including a reflection path as disclosed in JP-A-61-99906, 61-114611 and 61-139980. In these methods, an echo signal whose waveform deviates timewise from its input signal is produced by a signal delay circuit and added to the input signal at a ratio to thereby compensate for the undershoot.

SUMMARY OF THE INVENTION

As the storage capacity increases, the write density also increases. Therefore, the coercive force of a writing medium must be increased compared to the conventional one. Thus, the writing magnetic field of the magnetic head must also be increased compared to the conventional one. One method used for increasing the writing magnetic field is to increase the pole thickness in the case of a TFH. When writing and reading is made by this TFH, a possible undershoot which is produced in the vicinity of the outside pole-tip corner becomes remote from the center of the waveform because the pole thickness increases. Thus, a signal delay unit having a large delay time (more than 100 ns, for example, about 350 ns) is required and hence the transmission characteristic of the delay unit deteriorates. Transmission of signal waveforms using such delay unit would cause a waveform distortion to thereby bring about incorrect waveform equalization.

In order to mount the inventive apparatus on a small device, the number of elements of the waveform equalizer is required to be decreased due to a reduction in the area where the smaller device is mounted. Especially, the delay unit needs a large space for deposition, which is an obstacle to miniaturization.

No elimination of pseudo-peaks in the MIG head and MR head has been performed.

The equalizer including a reflection path disclosed in Japanese patent publication JP-A-61-139980 cannot perform equalization unless the positions of the pseudo-peaks are Symmetrical around the main peak.

In the conventional technique, for example, disclosed in FIG. 4 in U.S. Pat. No. 4,644,424, a signal waveform passes through two delay units, so that a deterioration in the signal cannot be avoided in a head having a thick pole. In this case, four delay units are required, which is an obstacle to miniaturization of the apparatus.

It is an object of the present invention to reduce as much as possible the number of delay units having a large delay time and present in the passageway through which the read signal waveform is transmitted, and to eliminate pseudo-peaks remote from the main peak due to the use of the magnetic head.

In order to achieve the object, the present invention provides a magnetic write and read apparatus comprising a magnetic head for reading a signal from a magnetic writing medium, a write and read circuit for reading binary data from a read signal from the magnetic head, and a servo circuit for positioning the magnetic head at a predetermined position relative to the magnetic writing medium on the basis of a read signal from the magnetic head, said apparatus comprising an equalizer including in a series or parallel connection at least two of the following: means for slimming the waveform of the read signal, means for eliminating a pseudo-peak on an advanced side of the read signal waveform, and means for eliminating a pseudo-peak on a delayed side of the read signal waveform.

Slimming the read waveform is sufficiently achieved by a delay unit having a short delay time (generally, tens of ns, for example, about 35–40 ns), so that deterioration in the waveform does not become an issue. In the present invention, slimming the waveform and eliminating the pseudo-peaks are performed by separate circuits. Thus, a deterioration in the waveform due to a delay unit having a long delay time which would otherwise be used for elimination of the pseudo-peak is prevented.

Since the means for slimming the read signal waveform, the means for compensating for a pseudo-peak on the advanced side and the means for compensating for a pseudo-peak on the delayed side can each be composed of a single delay circuit, the equalizer can be composed of at most 3 delay circuits. The means for slimming the read signal waveform, the means for compensating for the pseudo-peak on the advanced side and the means for compensating for the pseudo-peak on the delayed side may be each composed of a differential circuit to thereby provide a simplified circuit configuration compared to a construction composed of adders.

Preferably, the slimming means is connected in series with and after the means for compensating for the pseudo-peak on the advanced side or the means for compensating for the pseudo-peak on the delayed side because compensation for the pseudo-peak with a broad waveform before slimming facilitates the coincidence of the phases of the peaks.

The slimming means includes a delay unit for delaying a read signal, an attenuator connected in parallel to the delay unit, a differentiating circuit for receiving the outputs of the delay unit and the attenuator, and a resistor connected on the input side of the delay unit of the differentiating circuit to thereby cause the resistor to attenuate a signal reflected by the differentiating circuit to thereby perform an operation between the attenuated signal and the read waveform. The means for compensating the pseudo-peak is basically composed of a separate circuit from the slimming means.

As an example, the main peak waveform is slimmed. Thereafter, a delay unit having a long delay time is used to delay the main peak waveform and a deterioration in the transmission characteristic is used to form a delayed waveform with a broad peak. This waveform with a broad peak is used as a waveform for compensating the pseudo-peak. The delay time at that time is set such that the pseudo-peak of the main peak waveform overlaps with the peak of the delayed waveform. By coincidence of the delayed waveform thus created and the main peak waveform, the pseudo-peak at a position delayed relative to the position of the main peak is eliminated. Since the read signal waveform itself does not pass through a delay unit with a long delay time, no signal waveforms are deteriorated. In contrast, slimming may be performed after elimination of spurious peaks, as mentioned above.

Pseudo-peaks advancing in position compared to the main peak are eliminated using the following means. First, the main peak is input to two branching channels such that in one channel the main peak is attenuated by an attenuator to become a waveform having the same amplitude as the pseudo-peak while in the other channel the main peak waveform is delayed by a delay unit. The delay time at that time is set as the difference in time between the main peak and the pseudo-peak advancing in position compared to the main peak. By joining the two channels, the pseudo-peak on the advanced side is eliminated. In order to eliminate the pseudo-peak at the advanced position, the read signal waveform must be delayed to the position of the pseudo-peak. A deterioration in the signal waveform is reduced by using a delay unit which includes an assembly of delay sub-units with a short delay time to thereby provide less deterioration in the transmission characteristic. Such a delay unit can be composed of one tip including an assembly of delay sub-units.

By combining the means for eliminating the pseudo-peak on the advanced side with the means for eliminating the pseudo-peak on the delayed side, the pseudo-peaks existing before and after the main peak are eliminated. The means for eliminating the pseudo-peak on the advanced side may be disposed either before or after the means for eliminating the pseudo-peak on the delayed side, but disposition of the means for eliminating the pseudo-peak on the advanced side before the means for eliminating the pseudo-peak on the delayed side further improves the effect of elimination of the pseudo-peak.

In the case of a magnetic disk device, the relative velocity between the magnetic head and a writing medium varies depending on the radial position of the magnetic head, so that the time interval between the main peak and the pseudo-peak varies depending on the radial position of the magnetic head. For example, the spacing between the pseudo and main peaks is less in the outer peripheral region of the disk than in the inner peripheral region of the disk. Thus, the delay time is selected depending on the radial position of the head.

When an MR head is used as the read head, the polarity of the pseudo-peak changes depending on the structure of a shielding film and the written waveform. Thus, a circuit configuration usable for opposite polarities is employed. In the MR head, an MR sensor is usually disposed between two shielding films, but the position where the MR sensor is disposed is likely to deviate from a standard one due to uneven manufacture, so that the positions of the pseudo-peaks before and after the main peak are not necessarily symmetrical around the main peak.

According to the construction of the present invention, slimming and elimination of a pseudo-peak on the delayed side are achieved by a slimming circuit which comprises a first delay unit for delaying the read signal, a first attenuator connected in parallel with the first delay unit, a first differentiating circuit for receiving the output from said first delay unit and the output from said first attenuator, and a resistor connected to a first delay unit side input of the first differential circuit; and a pseudo-peak elimination circuit connected in series with the slimming circuit and comprising means for separating from the read signal the read signal or a signal reverse in phase to the read signal, a second delay unit for delaying the separated signal, a second attenuator for attenuating the amplitude of the separated signal, and a second differential circuit for receiving the read signal and the separated, delayed and attenuated signal. In addition, a pseudo-peak is eliminated by a second pseudo-peak eliminating circuit comprising a first signal line having a third delay unit for delaying the read signal, a second signal line including a third attenuator for attenuating the read signal or a signal reverse in polarity to the read signal, and a third differentiating circuit for subtracting the output of the second signal line from the output of the first signal line, the second pseudo-peak eliminating circuit being connected in series with the slimming circuit and the pseudo-peak eliminating circuit.

As will be clear from the above construction, the read signal waveform is not subjected to waveform equalization distortion due to a deterioration in the transmission characteristic because only one third delay unit having a long delay time through which the read signal waveform passes is required to be used, and hence pseudo-peaks remote from the main peak are eliminated. Thus, a pattern peak shift due to the pseudo-peaks is reduced. The use of only three delay units permits slimming and elimination of pseudo-peaks to thereby achieve miniaturization of the device.

The use of a variable delay time and a variable attenuation factor causes the apparatus to cope with a change in the position of occurrence of the pseudo-peaks, for example, due to a different peripheral linear velocity of a magnetic disk device. The pseudo-peaks existing before and after the main peak are eliminated by the different circuits, so that the apparatus can easily cope with different positions and different magnitudes of the pseudo-peaks.

When an arrangement is used in which only a pseudo-peak occurring at a position delayed from the main peak is eliminated, the second pseudo-peak eliminating circuit can be omitted and only two delay sub-units are required for composing the delay unit to thereby achieve miniaturization. The read signal waveform does not pass through the third delay unit with a long delay time, so that no waveforms are deteriorated. Even if only a pseudo-peak occurring at the delayed position is eliminated, advantages in the signal reading are clearly obtained.

DESCRIPTION OF THE PREFERRED EMBODIMENTS

Figure 2:
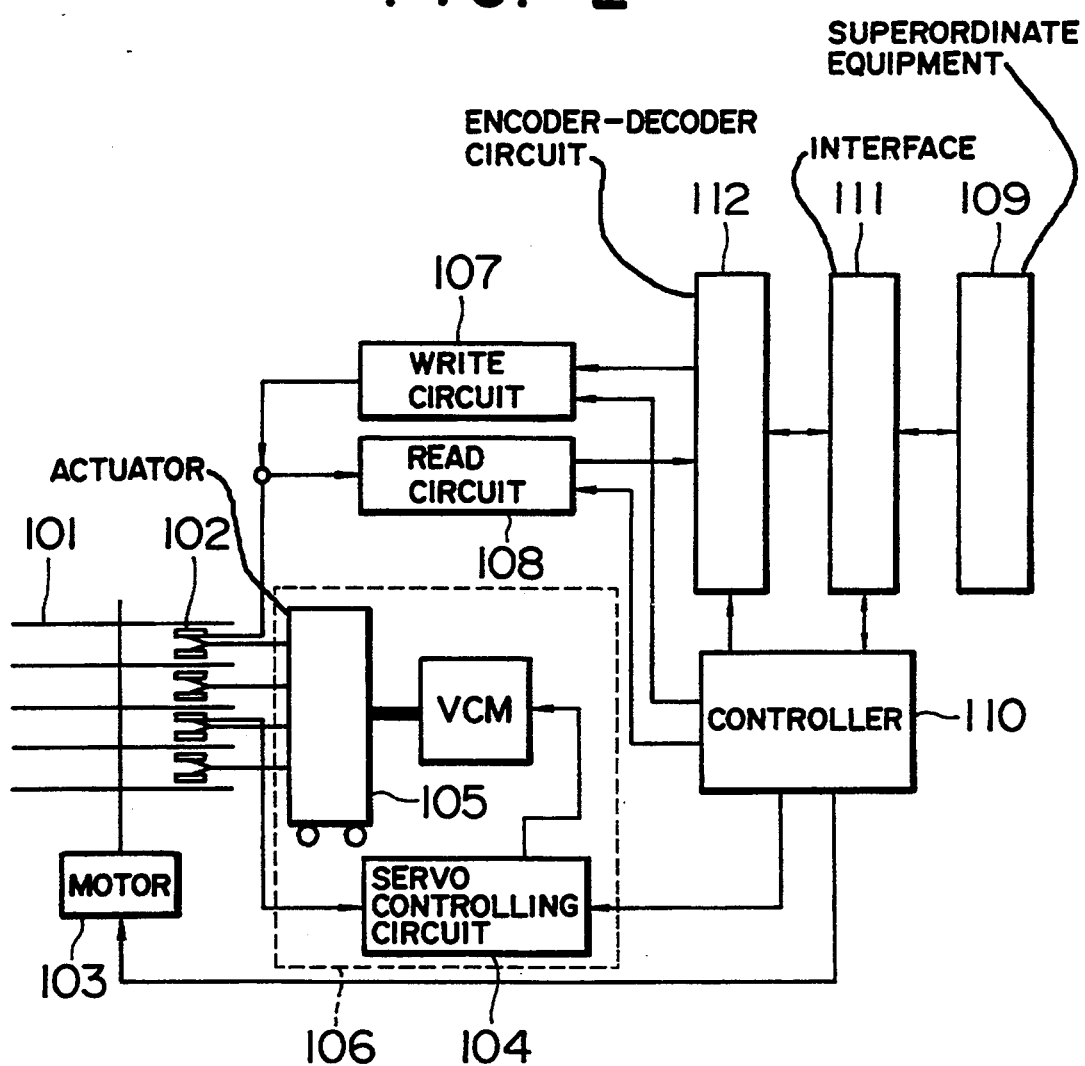
FIG. 2 shows the overall configuration of a magnetic disk apparatus.

The overall construction of a magnetic disk device will be described hereinafter with reference to FIG. 2.

The disk device is composed mainly of a magnetic disk 101 which stores information; a magnetic head 102 which writes/reads information to/from the magnetic disk; a spindle motor 103 which creates a relative speed between the magnetic disk and the magnetic head by rotation of the disk; a servo system 106 which includes a servo controlling circuit 104 which controls the position of the magnetic head over the magnetic disk and an actuator 105; an encoder-decoder circuit 112 which encodes a "1", "0" the information signals fed by super-ordinate equipment 109 through an interface 111; a write circuit 107 which causes the magnetic head 102 to write the encoded signals; a read circuit 108 which converts to "1", "0" representing the information read magnetically the magnetic head 102; a system in which the data decoded by the encoder-decoder circuit 112 for use in the super-ordinate equipment 109 is output through the interface 111 to the superordinate equipment; and a controller 110 which controls the respective elements of the device.

The present invention is applied to the read circuit 108 and intended to improve the device performance by processing the read waveform signals. The servo system 106 controls the position of the magnetic head over the disk on the basis of a read (servo) signal from the magnetic head. The present invention is also applicable to processing of the servo signals to thereby control high accuracy positioning and hence to improve the apparatus performance.

Figure 3:
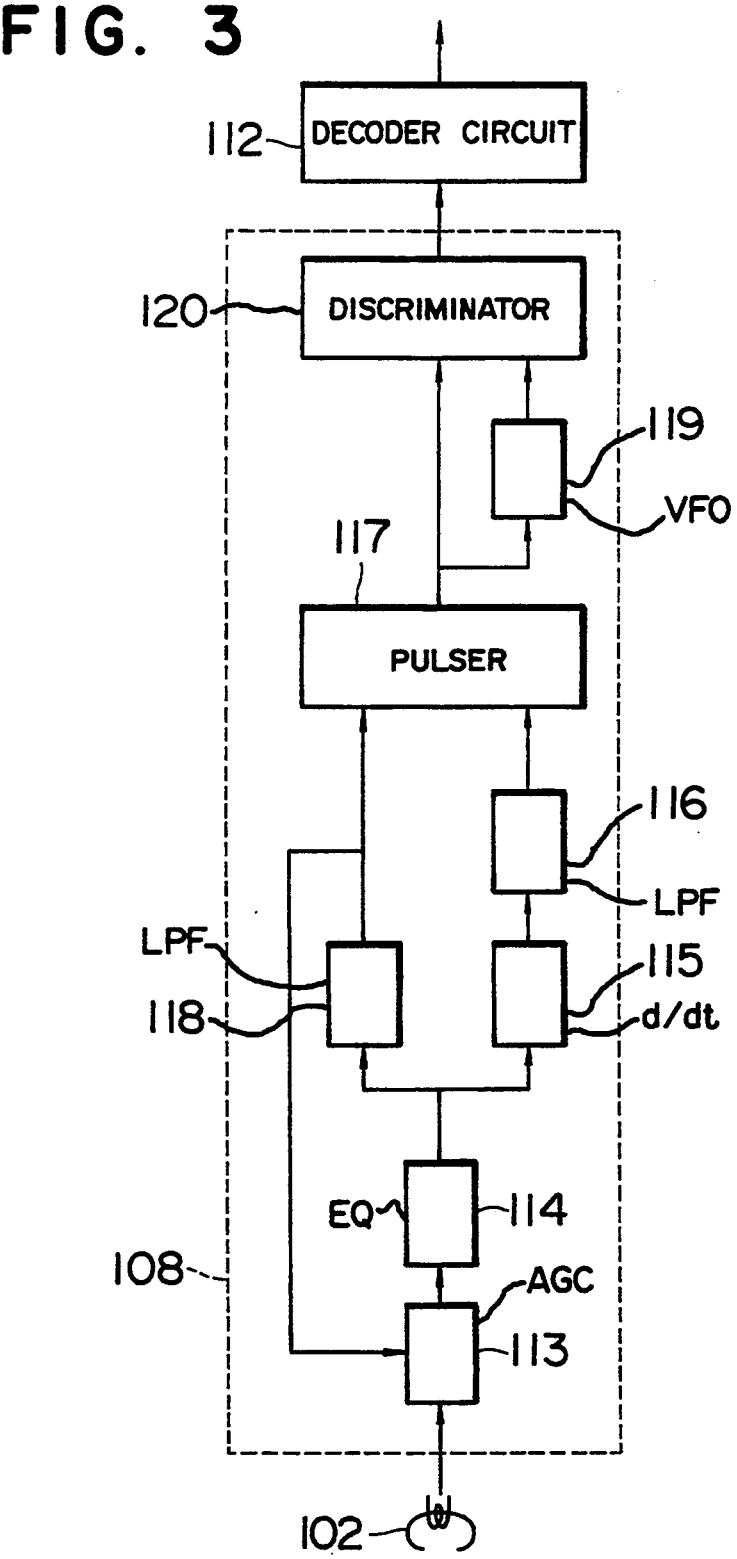
FIG. 3 is a schematic of a read circuit.

The structure of the read circuit 108 according to the present invention will be described below with reference to FIG. 3. In the conventional magnetic disk device, an NRZI write system is used in which the data "1" is magnetically written in the form of a magnetic transition. In this system, when read by the magnetic head 102, a peak of the read waveform corresponds to data "1". The function of discriminating a signal indicative of data "1" from the peak of the read waveform is required. The read circuit 108 has this function.

In this system, the signal read out by the magnetic head 102 is input to an automatic gain control amplifier (AGC) 113 to convert the signal read by the magnetic head 102 to a signal of a constant amplitude. The output signal from the AGC may be exposed to intersymbol interference by the read signal from adjacent magnetic transition. Thus, the output signal from the AGC is input to an equalizer (EQ) 114 to eliminate the intersymbol interference.

The EQ output then branches into two. In order to convert a peak of the waveform to a zero-crossing signal, it is input to a differentiating circuit 115 which also increases and emphasizes the frequency of noise in a zone other than in the required one. Thus, it is input to a low pass filter (LPF) 116 to eliminate the noise.

A pulser 117 produces a zero-crossing pulse from the zero-crossing position in the differentiated waveform. In the read low frequency signal, it is close to an isolated waveform and zero-crossing occurs in the differentiated waveform even in a signal zone other than the waveform peak. Thus, the zero-crossing pulse other than the waveform peak is eliminated using the other of the EQ outputs.

To this end, since noise other than the required signal zone is convolved in the EQ output waveform, the EQ output is passed through the LPF 118 to eliminate the noise. The resulting signal is then input to the pulser 117 to detect the amplitude of the waveform at a predetermined slice level. If at this time the waveform amplitude is higher than the slice level and a zero-crossing pulse is generated, this pulse is determined as one corresponding to the peak of the waveform.

Thus, a zero-crossing pulse corresponding to the waveform peak is generated. The data "1" and "0" are discriminated on the basis of this pulse. A time scale called a detection window signal is produced to perform the discrimination. This detection window signal is generated by a variable frequency oscillator (VFO) 119 composed of a phased lock loop oscillator for synchronization with the timing of the zero-crossing pulse. The detection window signal and zero-crossing pulse from the pulser are input to a discriminator 120. If there is a zero-crossing pulse in the detection window signal, "1" is discriminated and output. If not, "0" is discriminated and output. The data are decoded by the decoder 112 to obtain data which can be handled as data for the superordinate equipment 109. The above refers to the system and configuration of the read circuit 108.

When the present invention is applied in the read circuit 108, it is applied to the equalizer 114 more specifically. The present invention is intended to reduce a pattern peak shift due to the intersymbol interference between the main peak waveform and pseudopeaks (designated generally by all peaks except for the main peak due to the written signals by eliminating the pseudo-signals). When the present invention is used in the servo controlling circuit 104, a similar operation is performed and similar effects are produced.

The structure of an end portion of a magnetic head which generates pseudo-peaks handled by the present invention and read-isolated waveforms will be described with reference to FIGS. 4, 5 and 6.

Figure 4:
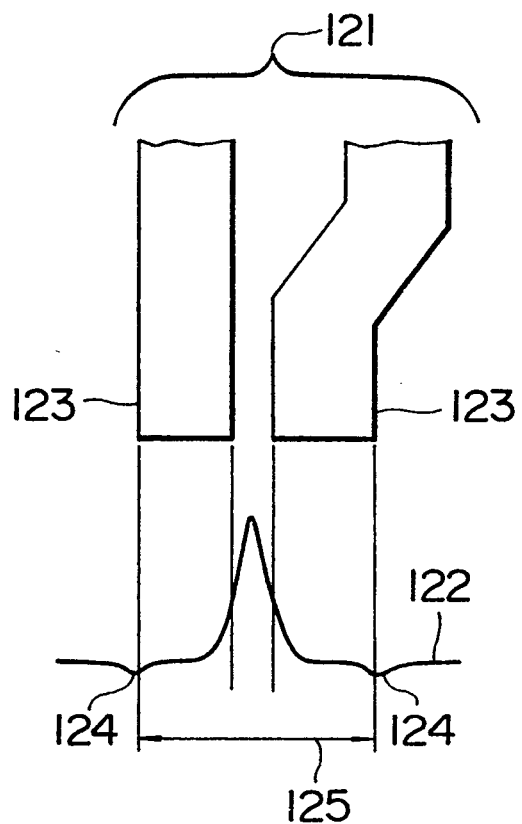
FIG. 4 shows the relationship between pole structure and read isolated waveform when the TFH is used.

First, FIG. 4 illustrates the relationship between the pole structure of a thin film head (TFH) 121 and a read isolated waveform 122. In the TFH, the pole-tip length 125 of the medium facing surface is so thin that it cannot be neglected compared to the bulk head used conventionally. Thus, even the outside pole-tip corner 123 is sensitive to a read magnetic field to generate a pseudo-peak 124 reverse in polarity to the main peak and called an undershoot. Since the pseudo-peak depends on the pole-tip length 125, an increase in the pole-tip length 125 causes the position of the pseudo-peak 124 to deviate. In the scale of FIG. 4, the pole thickness is on the order of several microns and the gap length is on the order of a submicron.

Figure 5:
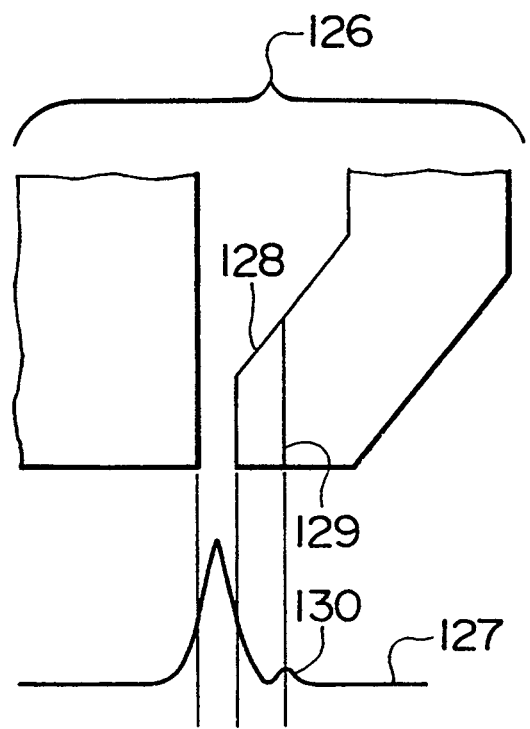
FIG. 5 shows the relationship between read isolated waveform and the structure of an MIG head in the vicinity of its gap.

FIG. 5 shows the relationship between the structure of a metal-in gap head (MIG head) 126 in the vicinity of the gap and a read isolated waveform 127. The MIG head 126 includes a magnetic film 128 of high saturated magnetic flux density provided on one of opposite surfaces of a conventional bulk head which define the gap in order to increase the write magnetic field. In this case, the interface 129 between the magnetic film and the bulk material is a pseudo-gap to output a pseudo-peak 130 of the same polarity as the main peak. Means are considered which structurally avoid such pseudo-peaks, but their structure is complicated to thereby make it difficult to reduce the track width.

There is a MIG head with magnetic films 128 of high saturated magnetic flux density provided on opposite surfaces of the head which define the gap. In this case, pseudo-peaks are produced before and after the main peak.

Figure 6:
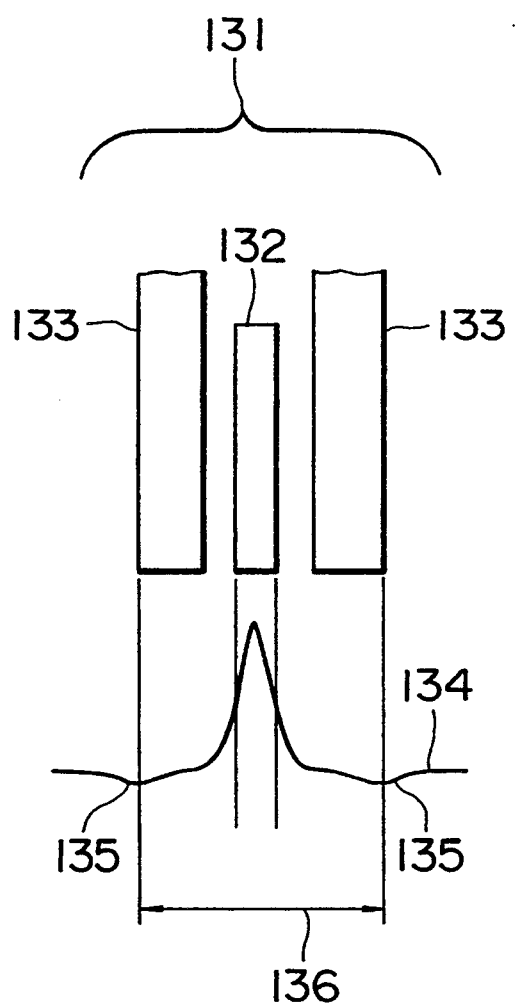
FIG. 6 shows the relationship between the read-isolated waveform and the structure of a magneto-resistive unit and a shielding film in the case of the MR head.

FIG. 6 shows the relationship between the arrangement of a magneto-resistive head (MR head) 131 including a magneto-resistive unit (MR unit) 132 and a shield film 133 and a read-isolated waveform 134. Since the use of only the MR unit 132 does not improve the read resolution, the shielding film 133 is provided to improve the read resolution. However, since the shielding film 133 is made of a magnetic material, a magnetic circuit is provided which absorbs a read magnetic flux through the MR unit 132. Therefore, a pseudo-peak 135 is produced at a position of the shield film 133. The polarity and magnitude of the pseudo-peak changes depending on the read wavelength and the thickness 136 of the MR head including the shielding film.

An embodiment of an equalizer used in the EQ portion 114 of the read circuit 108 in order to eliminate the pseudo-peaks will be described below. The use of a TFH, MR head or MIG head as a read magnetic head used in the present embodiment will be described.

EMBODIMENT 1

Figure 1:
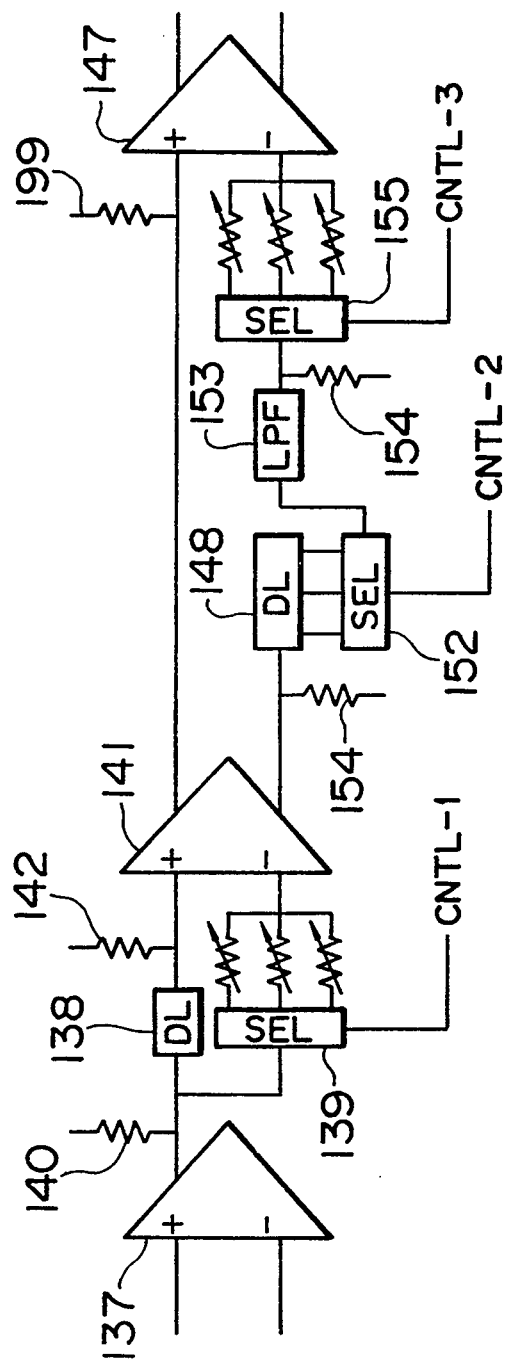
FIG. 1 shows a circuit configuration of an embodiment of the present invention which removes an undershoot delayed from the main peak read by a TFH.
Figure 7:
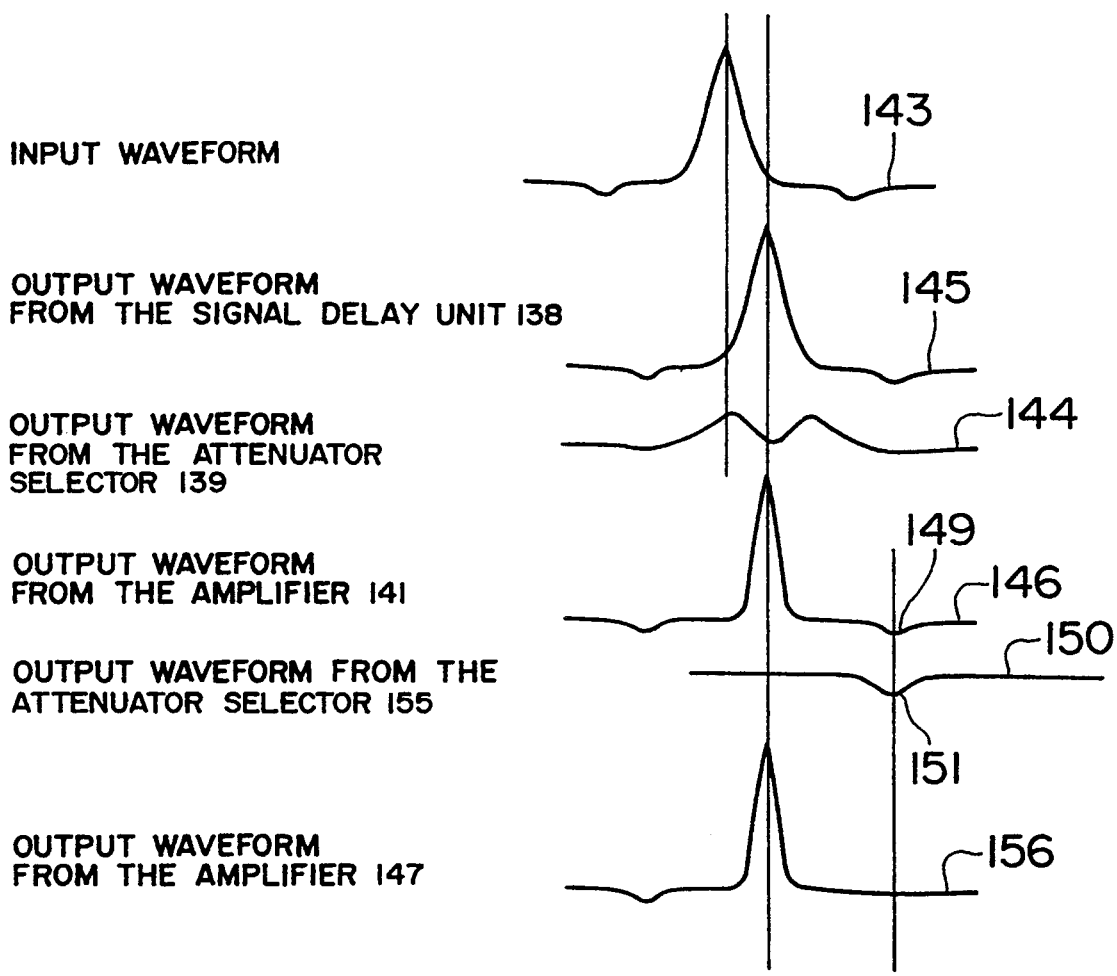
FIG. 7 shows the respective waveforms at the appropriate elements of the circuit shown in FIG. 1.

A first embodiment which uses a TFH will be described with reference to FIGS. 1 and 7. FIG. 1 shows the circuit configuration while FIG. 7 shows the respective waveforms at the appropriate elements of the circuit. In FIG. 1, the AGC 113 output is applied to a first differential amplifier 137, other output of which is input to a delay unit 138 and an attenuator selector 139. The first differential amplifier 137 may be a regular amplifier, but contributes to reduction in noise due to its differential arrangement. A resistor 140 is connected to the first amplifier output in order to establish impedance matching between the delay unit 138 and the first amplifier 137. The delay unit 138 output is input to the positive input of a second differential amplifier 141. In order to reflect the signal in this case, a resistor 142 determined by the reflection coefficient of the second amplifier 141 and the impedance of the delay unit 138 is connected to the input to the second amplifier 141. Thus, the first amplifier 137 output and the returning signal reflected by the second amplifier 141 output through the delay unit 138 are input to the attenuator selector 139.

The input waveform 143 shown in FIG. 7 is reflected as mentioned above, attenuated by the attenuator selector 139 as shown by a waveform 144, and input to the negative input of the second differential amplifier 141. The output of the delay unit 138 (a waveform 145 in FIG. 7) and the output of the attenuator selector 139 (a waveform 144 in FIG. 7) are synthesized in the second amplifier 141 to thereby produce a thinned main peak waveform (a slimmed waveform) shown by a waveform 146 in FIG. 7.

A structure which eliminates a pseudo-peak will be described next. One output of the second amplifier 141 is input to the positive input of a third differential amplifier 147 and the other output is input to the delay unit 148 to thereby delay the signal such that the peak 151 of the delayed signal 150 comes to the position of an undershoot 149 of the slimmed waveform 146. At this time, a delayed signal is output from each tap of the delay unit so as to be selected by the selector 152. The selected delay signal is input to a low pass filter 153 to convert the signal to a broad waveform with fewer high frequency components. As the characteristic of the low pass filter 153 in this case, the cut-off frequency and attenuation characteristic of the filter is required to be selected depending on the configuration of the waveform of the undershoot. In the present embodiment, the system uses a 3 MB/sec, 1-7 RLL (1-7 coding in Run Length Limited code) modulation, so that the cut-off frequency used was 4.5 MHz which was half of the highest writing density frequency of 9 MHz and a gentle 3-stage Gaussian typed low pass filter was used to provide a gentle attenuation characteristic. A gentler attenuation characteristic brings about less waveform distortion. To effect impedance matching, a resistor 154 of the same resistance as the characteristic impedance is connected on each of the input side of the delay unit 148 and the output side of the low pass filter 153 to prevent reflection. The delay unit 148 is selected so as to be the same in characteristic impedance as the low pass filter 153, the output of which is input to the attenuator selector 155 to thereby attenuate the output of the low pass filter 153 to make it the same in amplitude as the undershoot. The slimmed waveform (146 in FIG. 7) and the output of the attenuation selector 155 (150 in FIG. 7) are synthesized in the third amplifier 147 (ware form 157) to thereby eliminate the undershoot 149 at a position delayed compared to the position of the main peak, as shown by the waveform 156 in FIG. 7. A terminating resistor 199 prevents reflection of the signal in the differential circuit 147.

In a case of the magnetic disk device, the peripheral linear velocity varies depending on the radial position of the magnetic head, so that the position of occurrence of the undershoot and the read waveform width change. Control signals CNTL-1, CNTL-2, CNTL-3 are generated on the basis of information on the radial position to control the attenuator selectors 139, 155 and the delay unit tap selector 152 to thereby provide correct equalization following the position of the undershoot and the waveform width at all times.

EMBODIMENT 2

Figure 8:
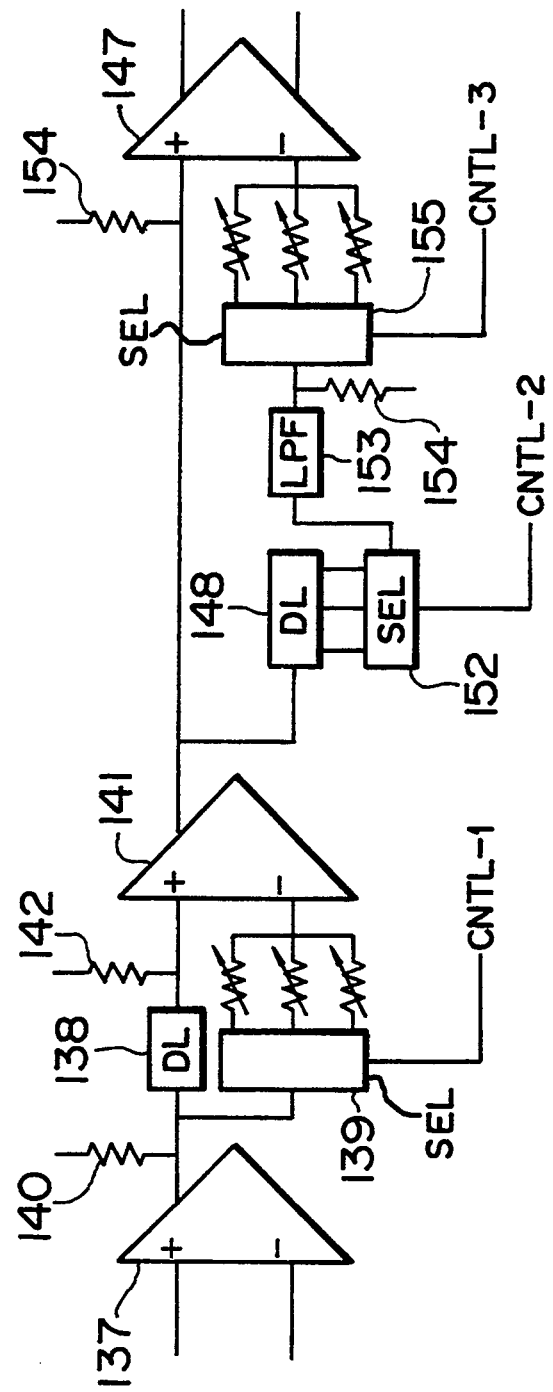
FIG. 8 shows the construction of a circuit to eliminate pseudo-peaks read by the MIG head.
Figure 9:
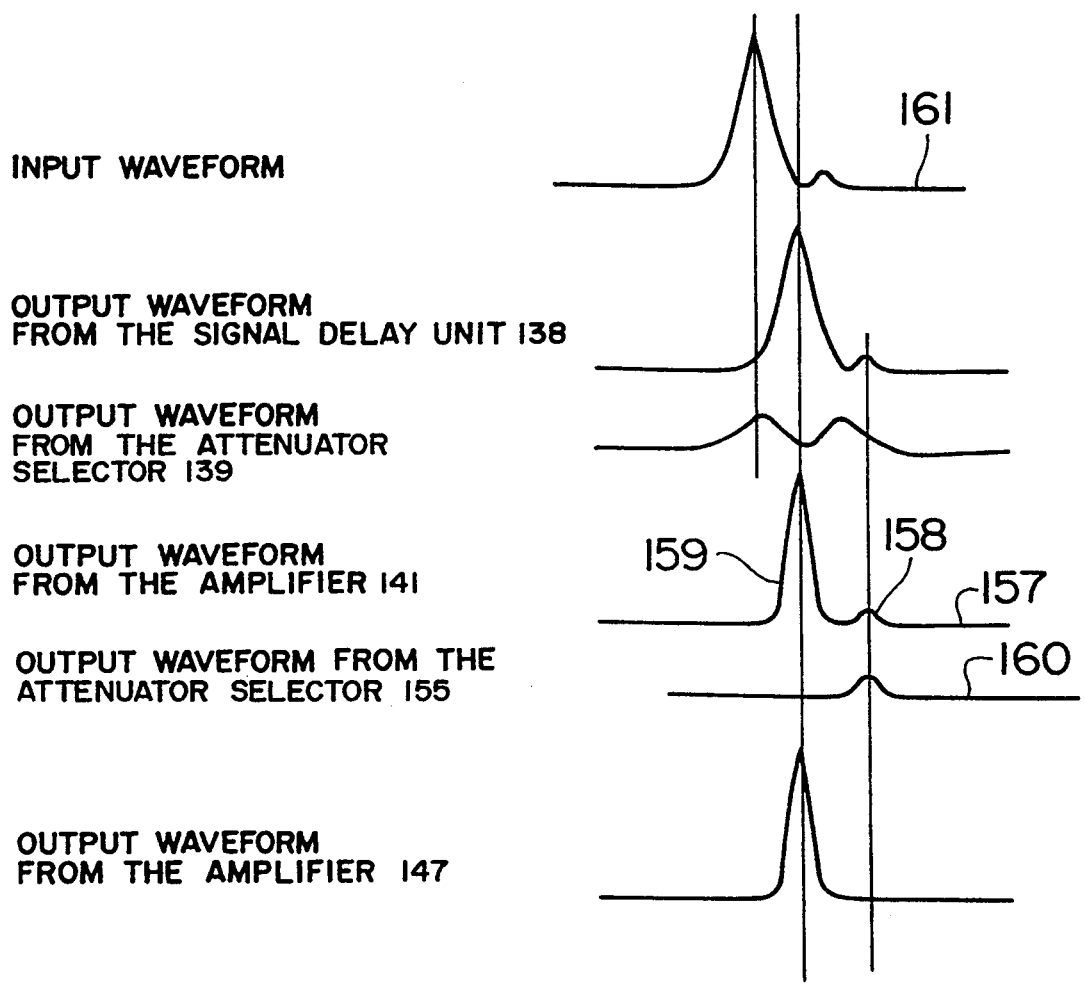
FIG. 9 shows the respective waveforms at the appropriate elements of the circuit of FIG. 8.

A second embodiment using an MIG head will be described with reference to FIGS. 8 and 9. FIG. 8 shows the circuit configuration while FIG. 9 shows the respective waveforms at the appropriate elements of FIG. 8. The process ranging from inputting the output 161 of the AGC 113 to obtaining an equalized slimmed waveform 157 is the same as in FIG. 1, and further description thereof will be omitted. A process for elimination of a pseudopeak 158 from the slimmed waveform will be described in this embodiment.

The pseudo-peak 158 in the MIG head is generated with the same polarity as a main peak 159, so that a signal reverse in polarity to the undershoot-free signal in the case of the TFH is required to be generated. To this end, a slimmed signal (waveform 157 in FIG. 9) is separated into two; one signal is input to a positive input of the third differential amplifier 147 while the other is input to the inverting input of the third differential amplifier 147 through a delay unit 148, tap selector 152, low pass filter 153, and attenuator selector 155 (to obtain a waveform 160 in FIG. 9). The method of eliminating the pseudo-peaks 158 in the third amplifier 147 is the same as in FIG. 1. The measures taken when the position of occurrence of the pseudo-peak 158 and the read waveform width depending on the radial position of the magnetic head change are the same as in the embodiment of FIG. 1.

EMBODIMENT 3

Figure 10:
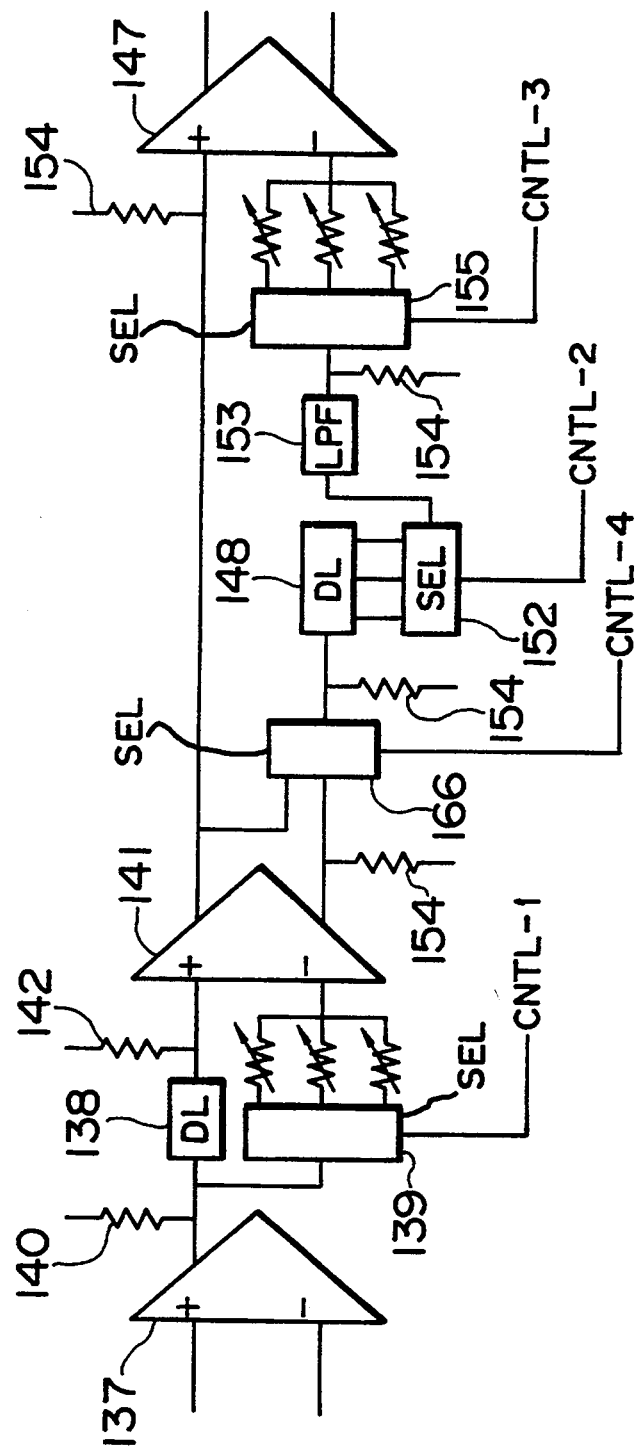
FIG. 10 shows the construction of a circuit an embodiment to eliminate pseudo-peaks read by the MR head.
Figure 11:
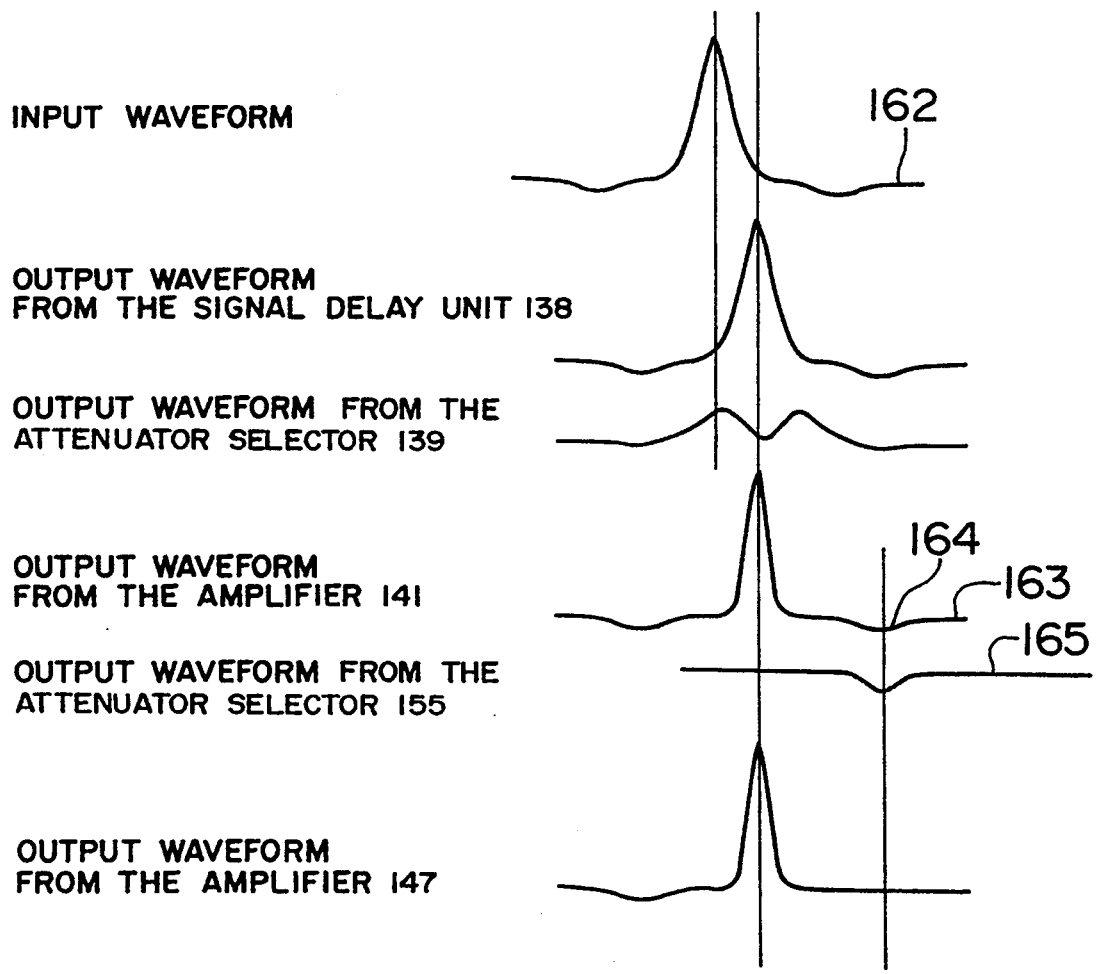
FIG. 11 shows the respective waveforms at the appropriate elements of the circuit shown in FIG. 10.

A third embodiment Using an MR head will be described with reference to FIGS. 10 and 11. FIG. 10 shows the circuit configuration while FIG. 11 shows the respective waveforms at the appropriate elements of the FIG. 10 embodiment. A process ranging from inputting the output 162 of the AGC 113 to equalization to the slimmed waveform 163 is the same as in FIG. 1 and further description thereof will be omitted. A process for eliminating a pseudo-peak 164 from a slimmed waveform 163 will be described in this embodiment.

First, in the case of the MR head, the polarity of the ps o-peak 164 is determined by the relationship between the writing wavelength and the thickness 136 of the MR head including the shielding film. Therefore, the polarity of the pseudo-peak-free signal 165 is also required to be selected depending on the above-mentioned relationship. To this end, control signals with the written wavelength and the MR head thickness as parameters are provided to thereby determine the polarity of the pseudopeak 164.

An embodiment having a circuit configuration which carries out this process is shown in FIG. 10. As shown in FIG. 10, when the pseudo-peak is of negative polarity, its elimination can be considered to be the same as elimination of an undershoot, so that the inverse output from the second differential amplifier 141 is selected by the polarity selector 166.

The following process is concerned with the elimination of a pseudo-peak 164 using the same process as the elimination of an undershoot by the TFH. If the pseudo-peak is of positive polarity, its elimination can be considered to be the same as the elimination of a pseudo-peak by the MIG head, so that the positive output from the second differential amplifier 141 is selected by the polarity selector 166. Thereafter, a pseudo-peak 164 is eliminated using the same process as the elimination of the pseudo-peak by the MIG head.

Figure 20A:
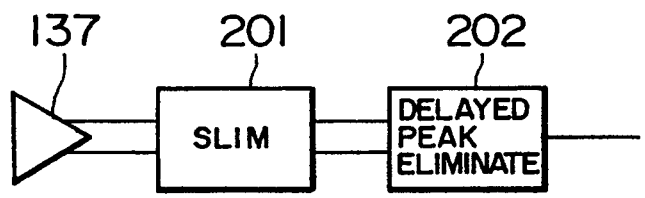
FIGS. 20A to C are block diagrams indicative of connection of a slimming circuit and a pseudo-peak elimination circuit.
Figure 20B:
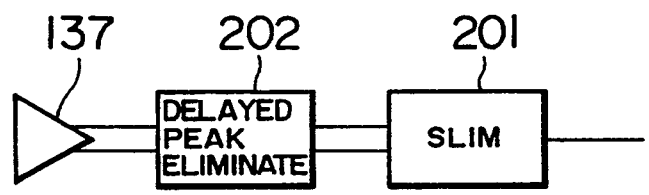

In the above embodiment, a pseudo-peak elimination circuit 202 is connected in series with and after a slimming circuit 201 as shown in FIG. 20A. Alternatively, a pseudo-peak elimination circuit 202 may be connected in series with and before slimming means 201 as shown in FIG. 20B.

EMBODIMENT 4

Figure 12:
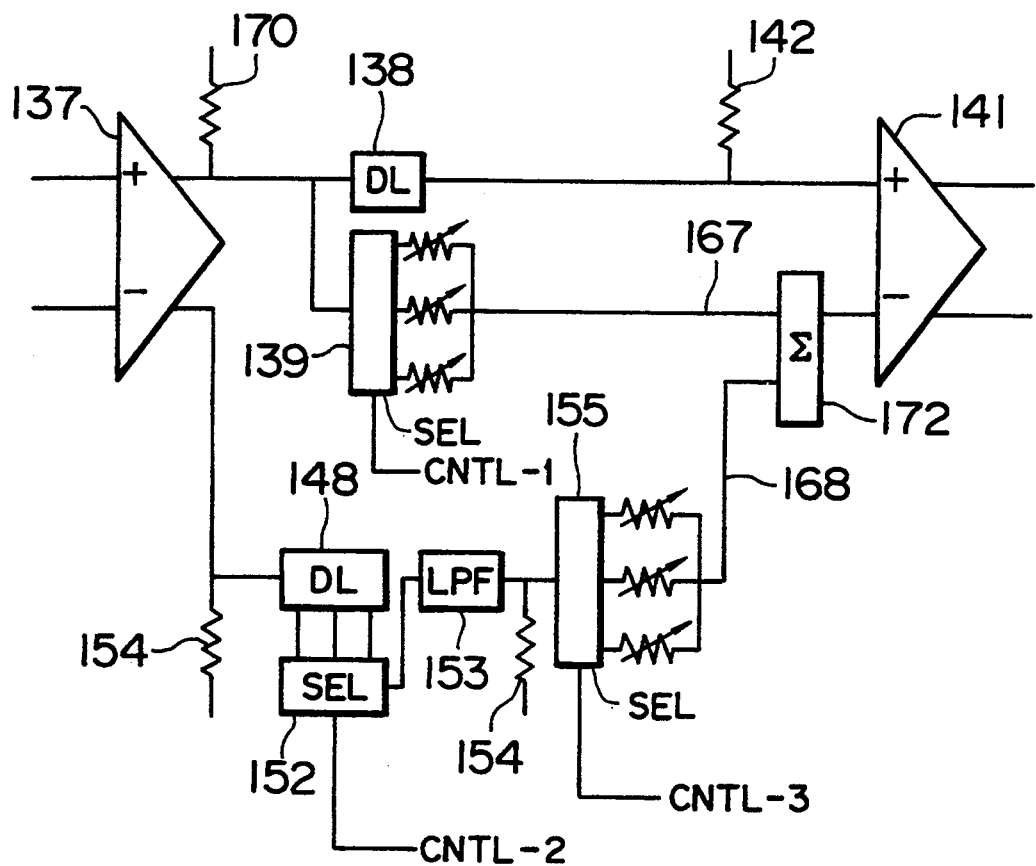
FIG. 12 shows the construction of a circuit of another embodiment for eliminating an undershoot due to reading by the TFH.

A fourth embodiment to eliminate an undershoot in the case of a TFH will be described below with reference to FIGS. 12 and 13. In the present embodiment, a slimming signal 167 and a signal 168 for eliminating an undershoot are added and slimmed by the second differential amplifier 141 to eliminate the undershoot.

In the circuit configuration, the output 161 of the AGC 113 is input to the first differential amplifier 137, one of whose outputs is connected to a slimming circuit or a delay unit 138 and an attenuator selector 139. The output of the delay unit 138 is input to a positive input of the second differential amplifier 141. At this time, a resistor 170 of the same resistance as the characteristic impedance of the delay unit 138 is connected to the output of the first amplifier 137 to cause the delay unit 138 to be matched in impedance with the first amplifier 137. A resistor 142 determined by the reflection coefficient and the characteristic impedance of the delay unit 138 is connected to the input of the second amplifier 141 to reflect the output signal 171 from the delay unit 138. The output of the attenuator selector 139 is applied to an adder 172 to add the output from the attenuator selector 139 and the under shoot-free signal 168 to be described later in more detail.

Figure 13:
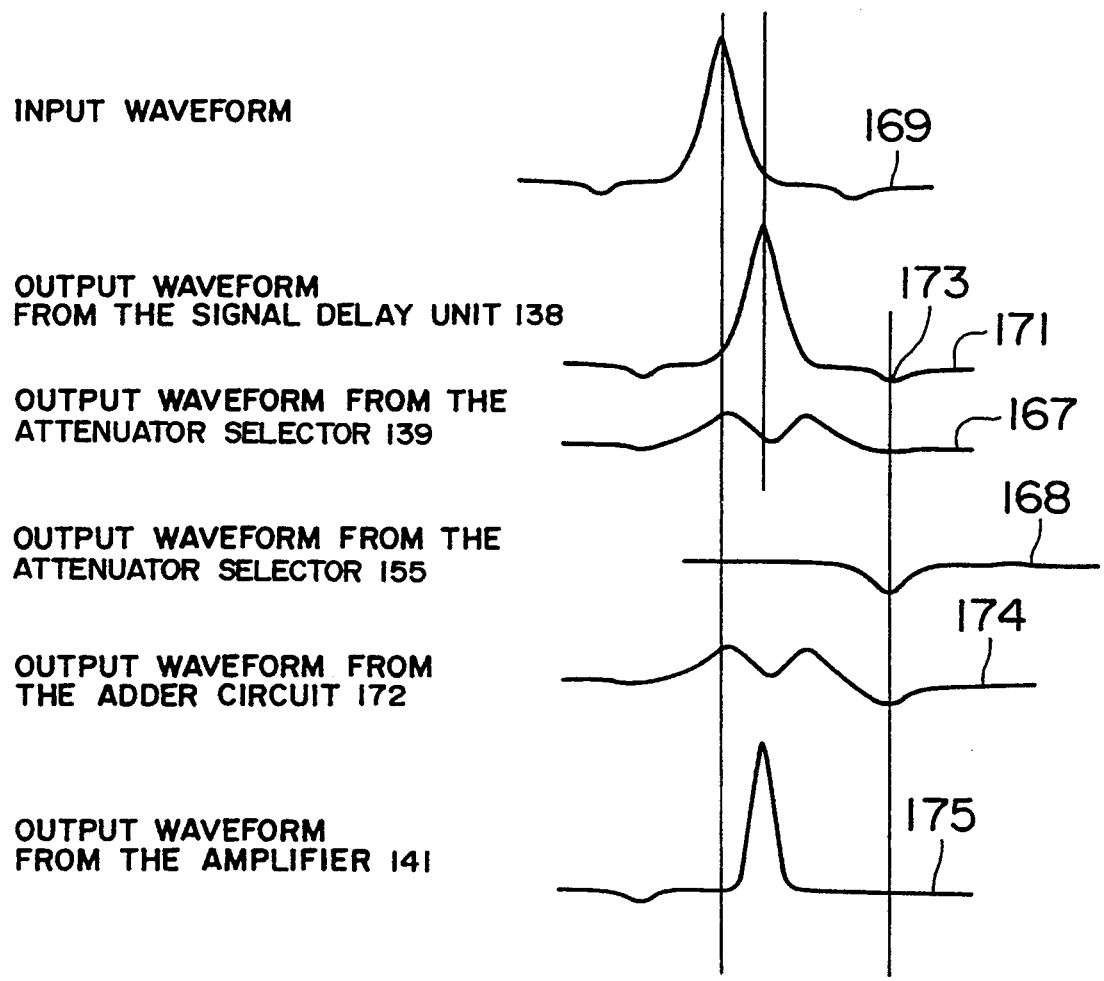
FIG. 13 shows the respective waveforms at the appropriate elements of the circuit of FIG. 12.

In order to generate the undershoot-free signal 168, first, the inverse output from the first amplifier 137 is input to the delay unit 148 where the input signal is delayed to the position 173 of the undershoot, as shown by a waveform 168 in FIG. 13. A tap selector 152 selects a delay time such that the undershoot-free signal comes at all times to the position of the undershoot on the basis of the relationship between the undershoot and the radial position of the magnetic head in the magnetic disk device. The output of the tap selector 152 is input to a low pass filter 153 to equalize the signal to a waveform free from high frequency components. The output from the tap selector 152 is input to the low pass filter 153 to an equalized waveform free from high frequency components. The output of the low pass filter 153 is then input to the attenuator selector 155 such that the output from the low pass filter 153 has substantially the same amplitude as the undershoot. Also, in this case, since the amplitude of the undershoot has radius dependency, a system which selects an attenuation coefficient is provided. The output of the attenuator selector 155 is input to the adder 172 which adds a signal for slimming (a waveform 167 in FIG. 13) and an undershoot eliminating signal (a waveform 168 in FIG. 13) to generate a signal (a waveform 174 in FIG. 13) to effect slimming and to eliminate the undershoot. The output 174 of the adder is then input to the inverting input of the second differential amplifier 141. In this way, the second differential amplifier 141 effects slimming and eliminates the undershoot to provide a waveform 175 as shown in FIG. 13.

Since this embodiment generates an undershootfree signal using a broad waveform before slimming, it is not influenced by a possible deviation of the delay time of the delay unit from the standard one. Therefore, elimination of the pseudo-peak is easy.

Figure 14:
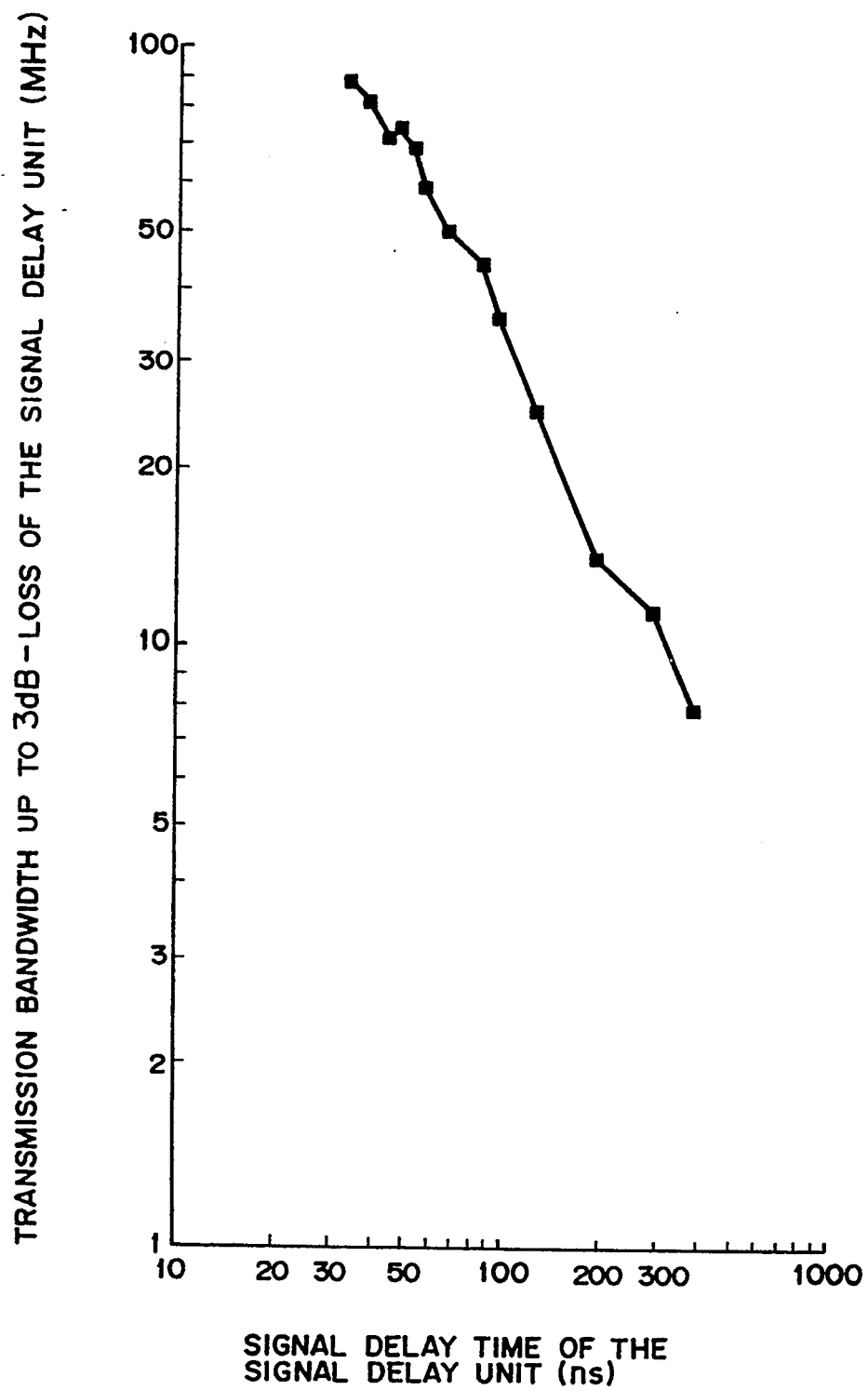
FIG. 14 shows the relationship between delay time and transmission band width of a delay unit.

As shown in FIG. 14, as the delay time of the delay unit increases, the transmission zone of the delay unit itself is reduced. For example, in the magnetic disk device, a signal zone is used which is about twice or three times as high as the highest written density frequency. Therefore, while the low pass filter is provided after the delay unit in the circuit which eliminates the pseudo-peaks described in the above embodiment, a deterioration in the characteristic of the delay unit can be used depending on the signal zone when the delay unit has a long delay time, so that an equivalent characteristic is obtained even though the low pass filter is removed.

EMBODIMENT 5

Figure 20C:
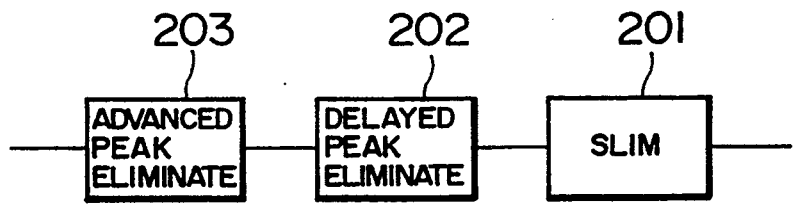

A process for removing a pseudo-peak advancing in position compared to the main peak will be described below. As shown in FIG. 20C, while an advancing pseudo-peak elimination circuit 203 is preferably disposed before a slimming circuit 201 and a delayed pseudo-peak elimination circuit 202, it may be disposed after the circuits 201 and 202.

A circuit which eliminates an undershoot advancing in position compared to the main peak in the case of use of a TFH will be described with reference to FIGS. 15 and 16. First, the output 178 from the preceding stage is input to the first differential amplifier 176 an output of which is input to a delay unit 177. The delay time at that time is such that a plurality of sub-delay units composing the delay unit is connected in series, each of which has a delay time within a transmission zone on the basis of the relationship between delay time and transmission zone shown in FIG. 14, and a transmission characteristic compensation circuit is inserted into the series connected delay sub-units so that the position 179 of the undershoot is the same as the position of the main peak (a waveform 180 in FIG. 16) before delay as a whole. Thereafter, in order to compensate for the radius dependency similarly to the method mentioned above, the delay time is optimized by a tap selector 181, the output from which is input to a positive input of the second differential amplifier 182. In order to prevent reflection on each of the input and output sides of the delay unit 177, a resistor 183 is connected for impedance matching purposes.

Figure 16:
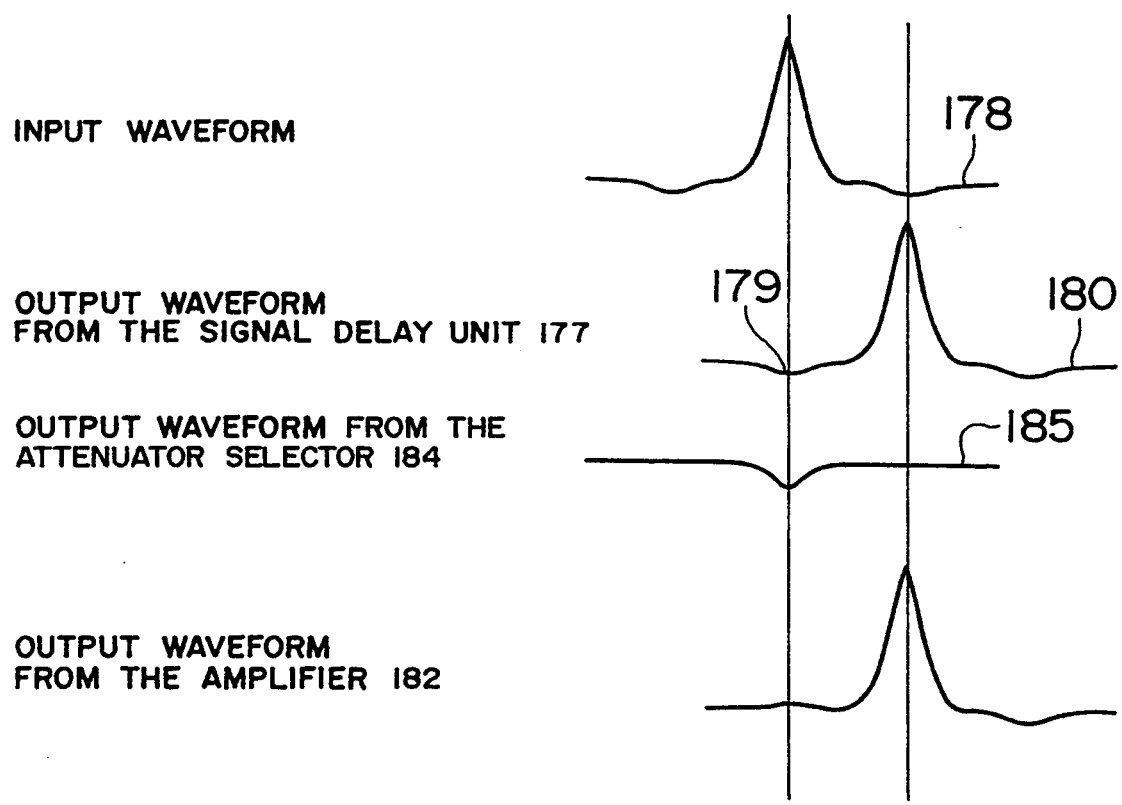
FIG. 16 shows the respective waveforms at the appropriate elements of the circuit of FIG. 15.

Another output from the first differential amplifier is input to the attenuator selector 184 to attenuate the signal so as to have the same amplitude as the undershoot, as shown by a waveform 185 in FIG. 16. Also, in this case, the amplitude of the undershoot has a radius dependency, so that the quantity of attenuation is controlled at the radial position. The output of the attenuator selector 184 is input to a negative input of the second differential amplifier 182. In this way, the undershoot advancing in position compared to the main peak is removed.

EMBODIMENT 6

Figure 15:
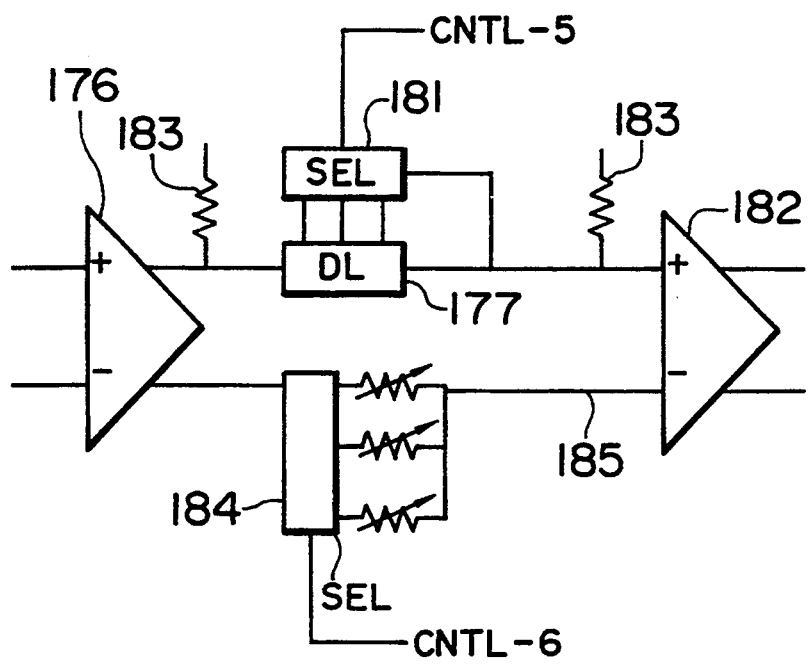
FIG. 15 shows the construction of a circuit of an embodiment to eliminate an undershoot advancing relative to the main peak due to reading by the TFH.
Figure 17:
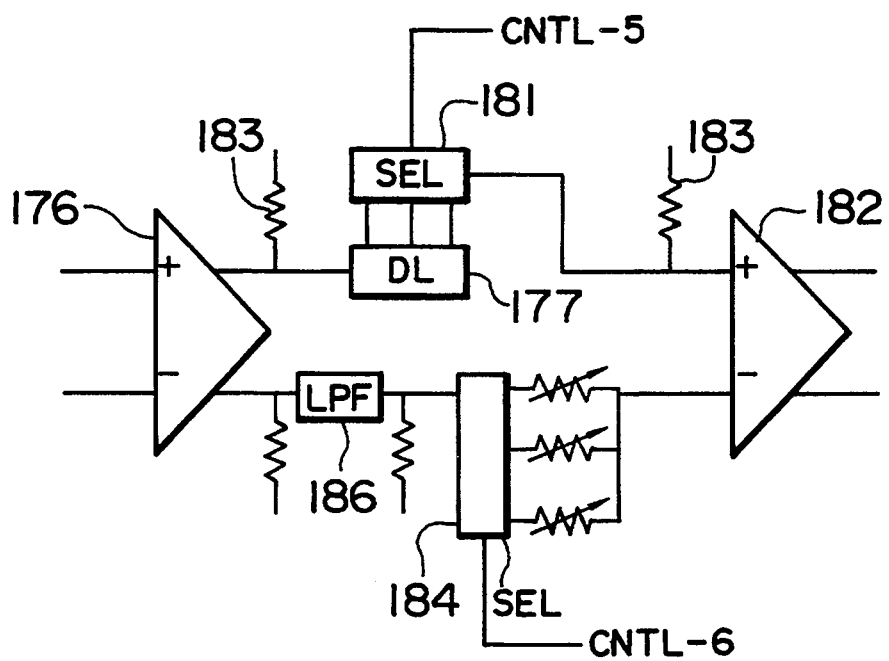
FIG. 17 shows the construction of a circuit of another embodiment for eliminating an undershoot advancing relative to the main peak due to reading by the TFH.

FIG. 17 shows an embodiment to prevent a reduction in the undershoot elimination effect even though there is a deviation in the position 179 of the undershoot or in the delay time of the delay unit 177 in the undershoot elimination circuit of FIG. 15. The arrangement is obtained by inserting a low pass filter 186 between the first differential amplifier 176 and the attenuator selector 184 of FIG. 15. By using this configuration, a signal 185 to eliminate an undershoot is broadened and the range of the undershoot elimination time is increased. Starting and terminating resistors are provided before and after the LPF 186 to eliminate reflection of the signal.

EMBODIMENT 7

A circuit which eliminates a pseudo-peak advancing in position compared to the main peak in the MR head will be described with reference to FIG. 18. The basic circuit configuration is the same as that in FIG. 15. In the case of the MR head, the polarity of the pseudo-peak may become positive or negative depending on the relationship between the written wavelength and the MR head thickness, as mentioned above. Therefore, the arrangement is such that signals are available from both the outputs from the first differential amplifier 176 and the polarity selector 187 to provide a signal of a required polarity. The output from the polarity selector 187 is input to an attenuator selector 184. The subsequent operation is the same as the corresponding one in FIG. 15. The connection between the first differential amplifier output and the delay unit 177 receives a reflection signal returning from the second amplifier 182. In order to prevent the interception of the reflection signal, the output from the first differential amplifier branches to the polarity selector 187 and a buffer 188 is inserted. The subsequent operation is the same as the corresponding one in FIG. 15 to thereby eliminate the pseudo-peak.

EMBODIMENT 8

Figure 18:
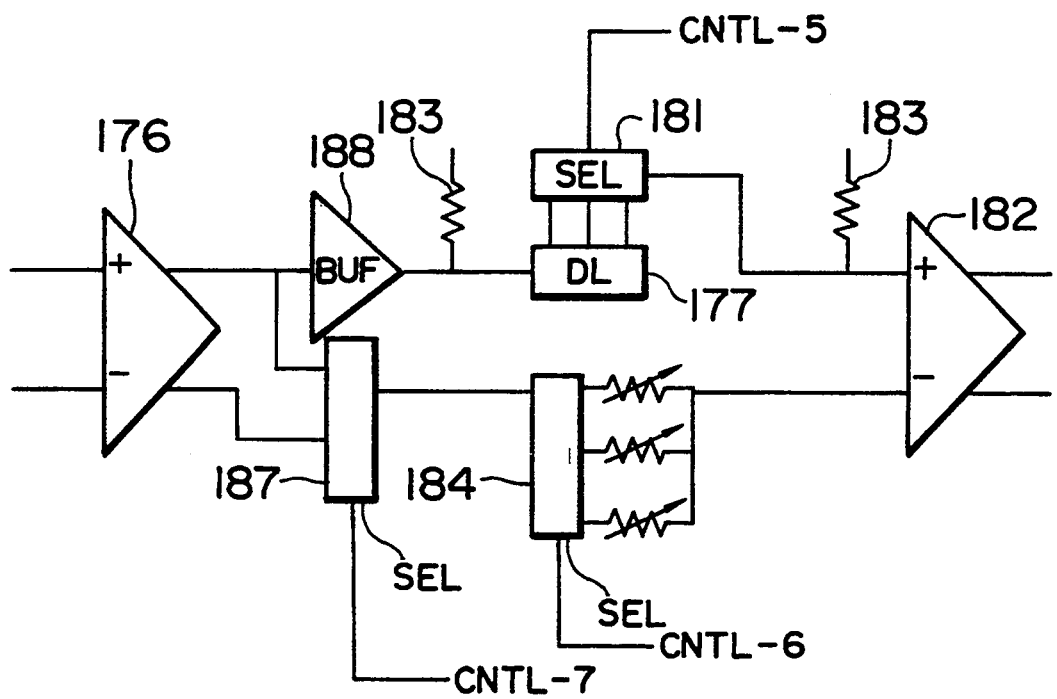
FIG. 18 shows the construction of a circuit of an embodiment for eliminating a pseudo-peak advancing relative to the main peak due to reading by the MR head.
Figure 19:
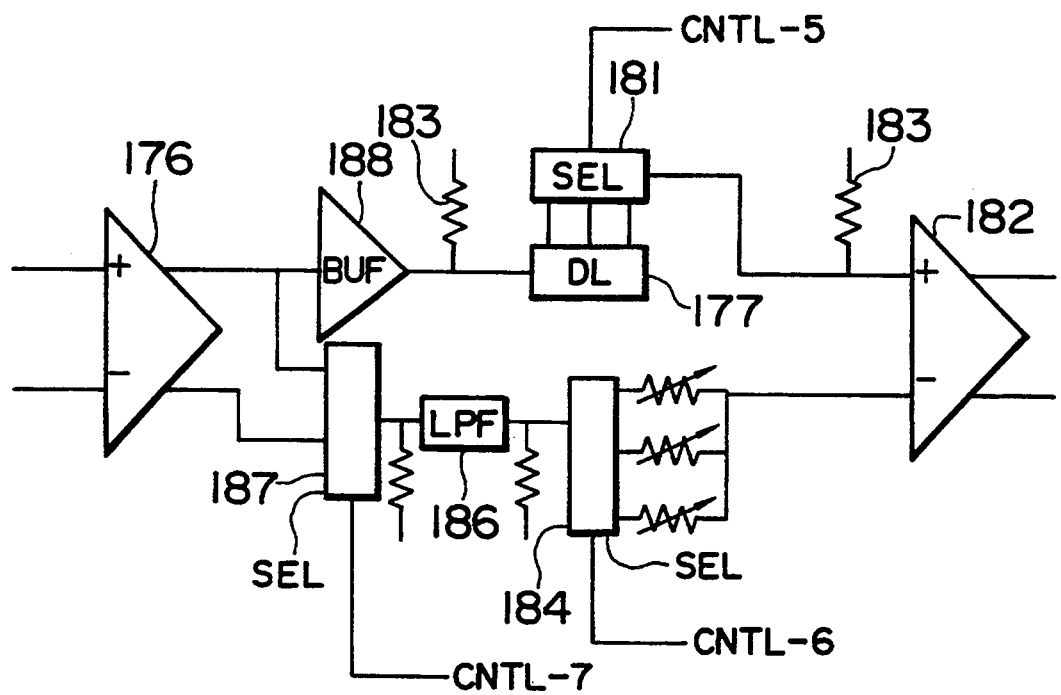
FIG. 19 shows the construction of a circuit of a further embodiment for eliminating pseudo-peaks advancing relative to the main peak due to reading by the MR head.

As shown in FIG. 19, an arrangement is obtained by providing a low pass filter 186 between the polarity selector 187 and the attenuator selector 184 of FIG. 18 as in the relationship between FIGS. 15 and 17. Thus, effects similar to those produced by the arrangement shown in FIG. 17 are obtained.

In the above embodiments, the same configurations are identified by the same reference numerals. According to the present invention, one or both of the possible pseudo-peaks present before and after the main peak are eliminated by provision of a few delay units. Also, when slimming is made and pseudo-peaks before and after the main peak are removed, waveform equalization is possible with three delay units. Therefore, the apparatus is reduced in size and a pattern peak shift due to intersymbol interference of the main peak and the pseudo-peaks is reduced.

We claim:

1. A magnetic write and read apparatus comprising a magnetic head for reading a signal from a magnetic written medium, a read circuit for reading binary data from a read signal provided by the magnetic head, and a servo circuit for positioning the magnetic head at a predetermined position relative to the magnetic written medium on the basis of the read signal from the magnetic head, said apparatus comprising an equalizer including:
   means for slimming the waveform of the read signal,
   means for eliminating a pseudo-peak on an advanced side of the read signal waveform, and
   means for eliminating a pseudo-peak on a delayed side of the read signal waveform;
   wherein said means for eliminating a pseudo-peak on a delayed side comprises:
   means for separating the read signal;
   means for forming an in-phase output and an opposite-phase output, which is opposite in phase from the in-phase output, from the separated rad signal;
   a polarity selector for receiving the in-phase output and the opposite-phase output;
   means for controlling said polarity selector and a polarity of an output signal from said polarity selector based on the polarity of the pseudo-peak on the delayed side;
   means for delaying the output signal of said polarity selector;
   a tap selector for selecting a quantity of delay by said delaying means;
   an attenuator selector for receiving an output from said tap selector;
   means for selecting and controlling a quantity of attenuation of said attenuator selector; and
   a differential amplifier for receiving at a negative input an output from said attenuator selector, and for receiving at a positive input the read signal.

2. An apparatus according to claim 1, wherein said slimming means, said means for eliminating the pseudo-peak on the advanced side and said means for eliminating the pseudo-peak on the delayed side each comprises a single delay circuit.

3. An apparatus according to claim 2, wherein each said delay circuit comprises second delay means, each of which comprise a plurality of series-connected delay sub-units each having a delay time in a transmission zone, and a circuit for compensating for a transmission characteristic in the series connected delay sub-units.

4. An apparatus according to claim 1, wherein said equalizer comprises a first delay unit for delaying a read signal, a first attenuator connected in parallel with said first delay unit, means for forming a signal reverse in phase to the read signal, a second delay unit for delaying the signal reverse in phase to the reads signal, a second attenuator for attenuating the signal reverse in phase to the read signal, an adder for adding the signal reverse in phase to the delayed and attenuated read signal to the output signal from said first attenuator, an operation circuit for receiving the output from said first delay unit through a resistor for signal reflection to perform an operation between the output from said first delay unit and the output from said adder.

5. An apparatus according to claim 4, further comprising a low pass filter for receiving a signal reverse in phase to the read signal and for outputting a filtered signal to a second attenuator.

6. An apparatus according to claim 1, wherein said equalizer further comprises means for separating the read signal into read signals in a first and a second line, a second delay means for delaying the read signal in said first line, said polarity selector receiving the in-phase and opposite-phase outputs from said second line, an attenuator for attenuating the output from said polarity selector, and an operation circuit for receiving the read signal through a resistor for reflection of the read signal to perform an operation between the reflected read signal and the output from said attenuator.

7. An apparatus according to claim 6, comprising a low pass filter for receiving the output from said polarity selector and for delivering a filtered output to said attenuator.

8. An apparatus according to claim 1, wherein said slimming means, said means for eliminating the pseudo-peak on the advanced side and said means for eliminating the pseudo-peak on the delayed side each comprises a single differential circuit.

9. An apparatus according to claim 1, wherein said means for eliminating the pseudo-peak on the advanced side is connected in series with and before said means for eliminating the pseudo-peak on the delayed side.

10. An apparatus according to claim 1, wherein said slimming means comprises a first delay unit for delaying the read signal, an attenuator connected in parallel with said first delay unit, a differential circuit for receiving the output from said first delay unit and the output from said attenuator, and a resistor connected to a delay unit side input of said differential circuit.

11. An apparatus according to claim 1, wherein said equalizer comprises a first delay unit for delaying a read signal, means for forming a signal reverse in phase to the read signal, an attenuator for attenuating the signal reverse in phase to the read signal, an operation circuit for receiving the read signal through a resistor for reflection of the read signal to perform an operation between the received read signal and the output from said attenuator.

12. An apparatus according to claim 1, wherein said slimming means is connected after and in series with said means for eliminating a pseudo-peak on the advanced side.

13. An apparatus according to claim 1, wherein said slimming means is connected after and in series with said means for eliminating a pseudo-peak on the delayed side.

14. An apparatus according to claim 1, wherein said slimming means is connected in parallel with said means for eliminating a pseudo-peak on the delayed side.

15. An apparatus according to claim 1, wherein said slimming means is connected in parallel with said means for eliminating a pseudo-peak on the advanced side.

* * * * *